No. 765,404. PATENTED JULY 19, 1904.
H. THADEN.
PLANT SUPPORT.
APPLICATION FILED MAR. 3, 1903.
NO MODEL.
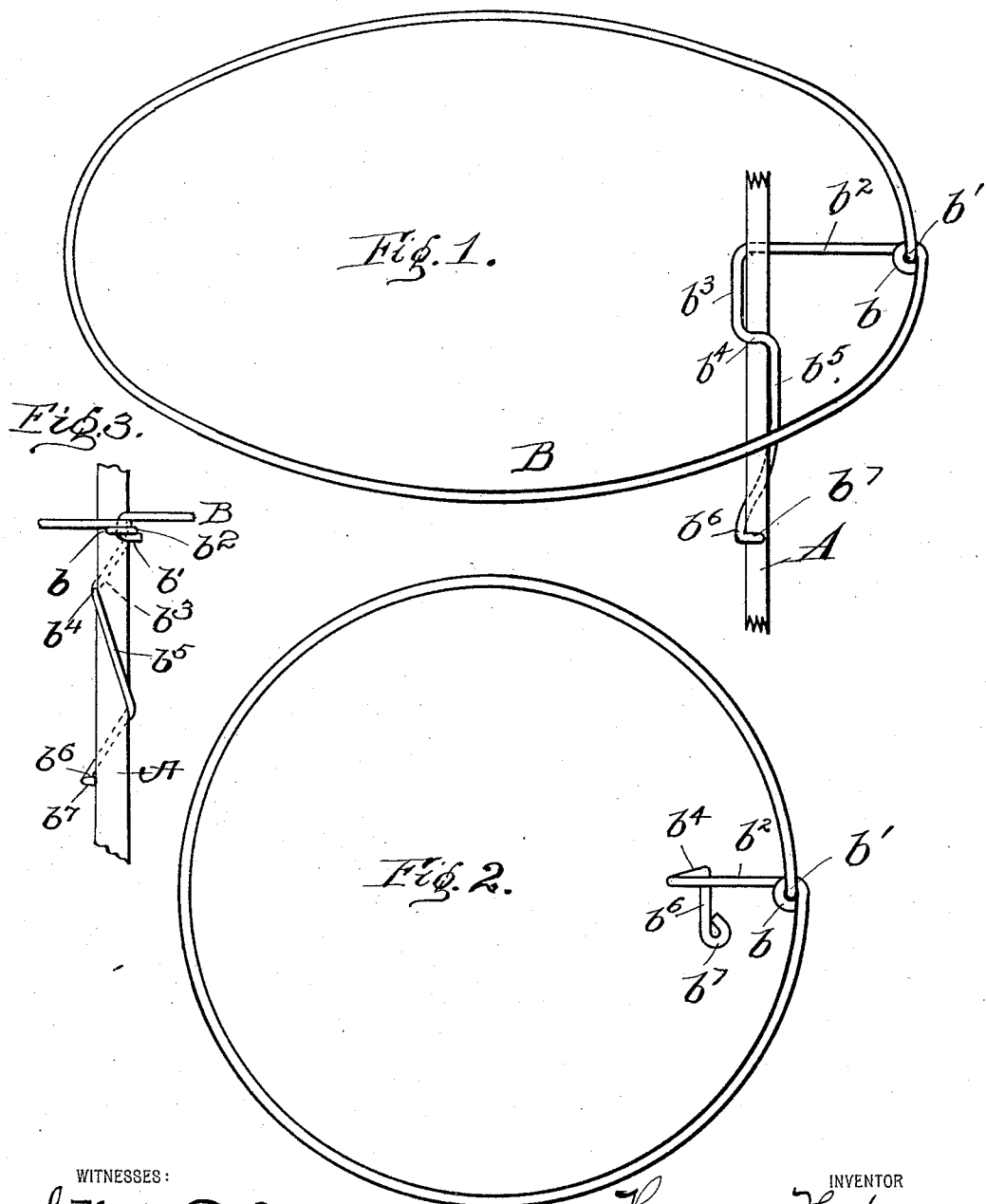

No. 765,404. Patented July 19, 1904.

UNITED STATES PATENT OFFICE.

HERMAN THADEN, OF ATLANTA, GEORGIA.

PLANT-SUPPORT.

SPECIFICATION forming part of Letters Patent No. 765,404, dated July 19, 1904.

Application filed March 3, 1903. Serial No. 145,920. (No model.)

*To all whom it may concern:*

Be it known that I, HERMAN THADEN, a citizen of the United States of America, and a resident of Atlanta, in the county of Fulton and State of Georgia, have made certain new and useful Improvements in Plant-Supports; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to devices for supporting the tender, weak, or top-heavy stems and branches of growing plants, the object of the invention being to provide a device of this class which will be adapted to use in almost any place and easily and perfectly adjustable to meet all needs.

The device consists of the peculiarly-bent wire, hereinafter described, and shown in the accompanying drawings, in which—

Figure 1 is a perspective view of the device in position on a stake or vertical support, and Fig. 2 is a plan of the wire with its free ends joined or hooked together. Fig. 3 is an enlarged detail view showing the connection between the ends of the loop.

In the figures like reference characters are uniformly employed in the designation of corresponding parts in all the views.

A is a stake or vertical support, of wood, wire, or the like, which may be inserted in the ground or earth in a pot which contains the plant, and the device forming the subject-matter of this present invention is secured to same near its upper end.

The device consists of a wire having means at one end for engaging the said stake, while its main body is bent into a circle encircling said plant and having its free end joined to itself near the said stake, whereby a continuous ring is formed, supported by the stake.

In carrying out my invention I make the plant-inclosing loop or hoop B by first bending an eye $b$ nearer one end of the wire than the other and causing a portion of the wire to lie in a circle, with a hook, formed in its free end at $b^3$, adapted to engage the eye $b$, while I project a short part $b^2$ of the wire radially of the circle to the desired distance from the center thereof, (the nearer the better,) although some plants obviously permit of a less extension thereof. I then make a bend whereby a short portion $b^3$ of the wire is formed, standing at a right angle, approximately, to the part $b^2$ and perpendicular to the plane of the ring, as best seen in Fig. 1, while a short section $b^4$ is formed, lying in a plane parallel to the part $b^2$, but at an angle thereto, the wire from there extending downwardly in part $b^5$ and being bent at a right angle to the part $b^2$ at $b^6$, terminating in a hook, eye, or enlargement $b^7$, whereby the stake is grasped.

When mounted upon a suitable stake, the device is firmly held in place by the several parts $b^2$ $b^7$ pressing upon different sides of the stake. This connection between the device and the stake permits a vertical adjustment of the former upon the latter. Also by drawing the hooked end of the wire through the eye $b'$ the size of the inclosing loop can be regulated to accommodate the device to the size of the plant.

The wires should be made of an excessive length in order that the hook $b'$ may be formed to suit the requirements of each plant and the plant be either loosely or closely inclosed, as desired by the user.

Having thus described my invention, what I claim as new, and desire to secure by Letters Patent of the United States of America, is—

A plant-support formed of a single piece of wire comprising an inclosing loop having an eye in one end and a hook in the other end engaging with said eye, and means for adjustably mounting the device upon a stake consisting of a continuation of the eyed end of the loop projecting inwardly of said loop, a part extending downwardly from said inwardly-projecting part, a part projecting approximately at right angles to said downwardly-extending part, a part extending obliquely downward from said right-angle projecting part, and a hook on the lower extremity of said part extending obliquely downward.

In testimony whereof I hereunto affix my signature in presence of two witnesses.

HERMAN THADEN.

Witnesses:
  A. P. WOOD,
  EDWD. P. WOOD.